Figure 1:
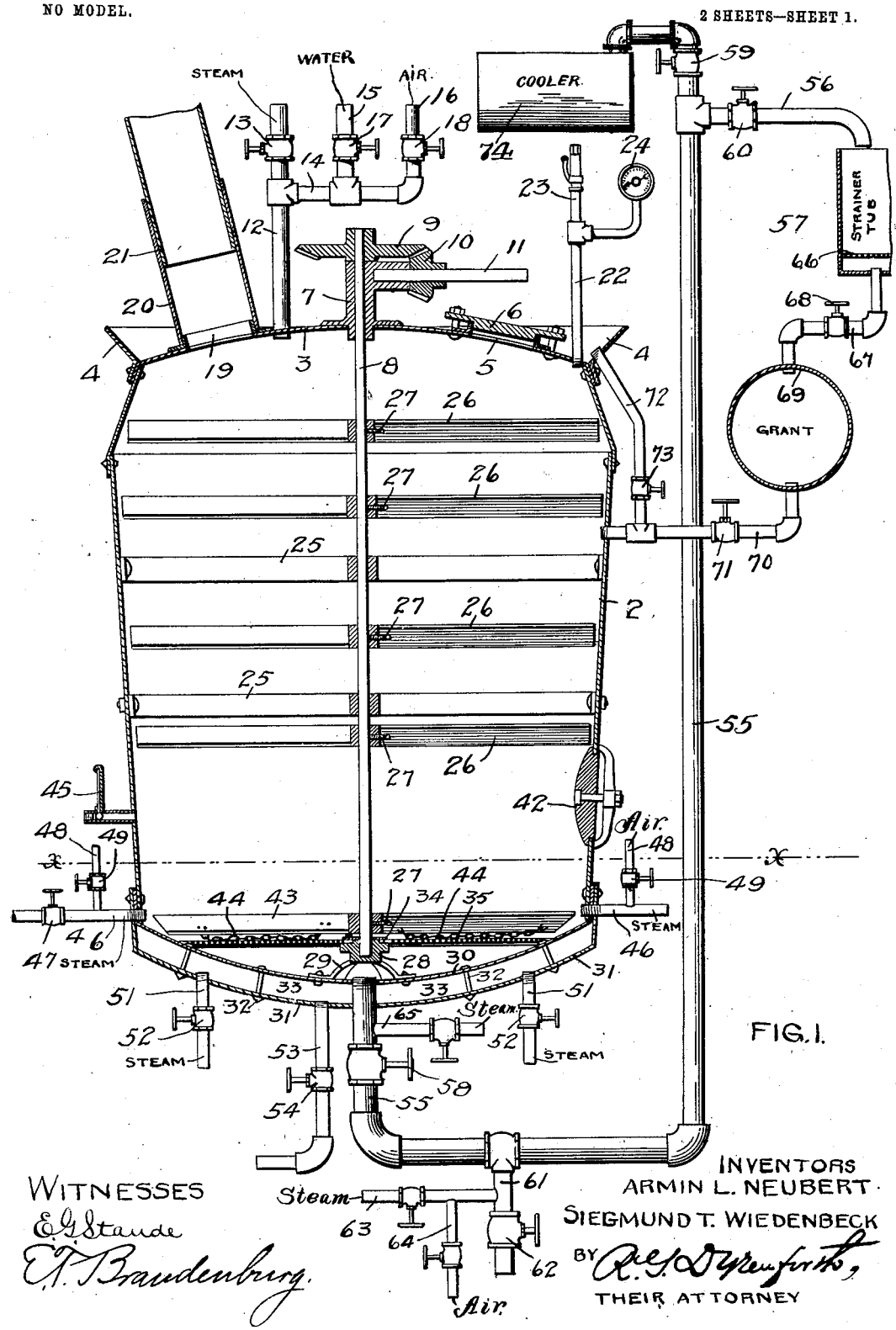

No. 749,087. PATENTED JAN. 5, 1904.
A. L. NEUBERT & S. T. WIEDENBECK.
BREWER'S APPARATUS.
APPLICATION FILED AUG. 7, 1903.
NO MODEL. 2 SHEETS—SHEET 2.
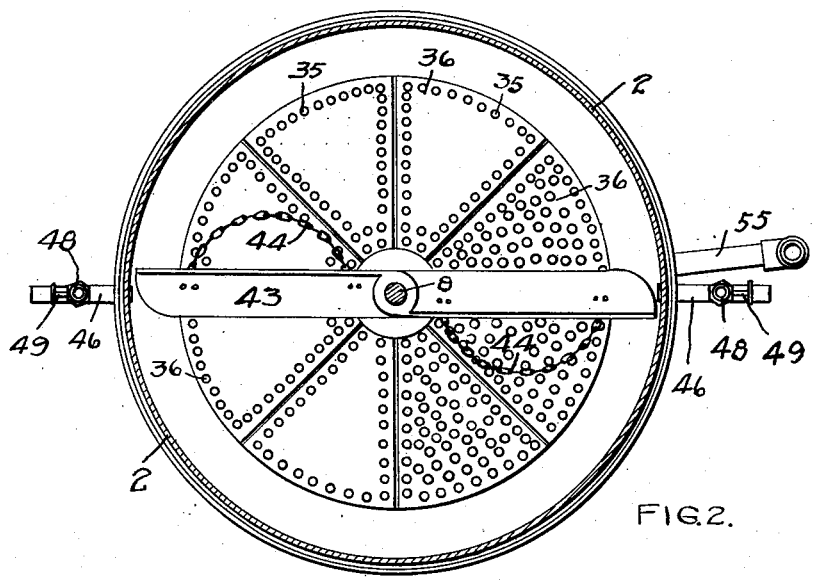
FIG. 2.
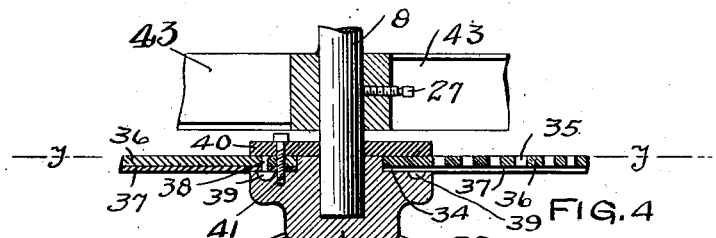
FIG. 4.
FIG. 5.
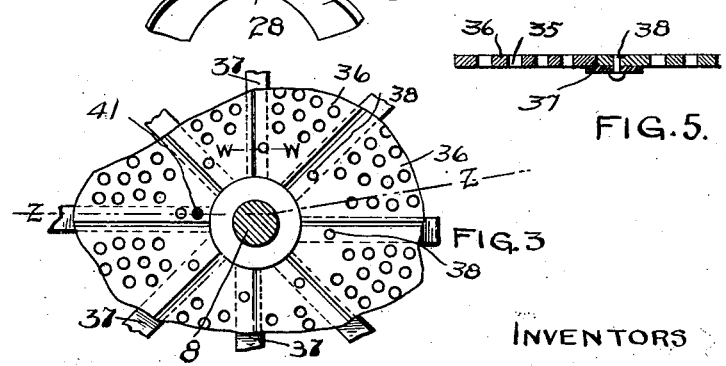
FIG. 3.
WITNESSES
E. G. Staude
E. T. Brandenburg
INVENTORS
ARMIN L. NEUBERT
SIEGMUND T. WIEDENBECK
BY R. S. Dyrenforth,
THEIR ATTORNEY No. 749,087.

Patented January 5, 1904.

UNITED STATES PATENT OFFICE.

ARMIN L. NEUBERT AND SIEGMUND T. WIEDENBECK, OF MINNEAPOLIS, MINNESOTA.

BREWER'S APPARATUS.

SPECIFICATION forming part of Letters Patent No. 749,087, dated January 5, 1904.

Application filed August 7, 1903. Serial No. 168,675. (No model.)

*To all whom it may concern:*

Be it known that we, ARMIN L. NEUBERT and SIEGMUND T. WIEDENBECK, citizens of the United States, residing at Minneapolis, in the county of Hennepin and State of Minnesota, have invented certain new and useful Improvements in Brewers' Apparatus; and we do hereby declare the following to be a full, clear, and exact description of the invention, such as will enable others skilled in the art to which it appertains to make and use the same.

The object of our invention is to provide a single apparatus capable of replacing a plurality of independent devices heretofore employed in breweries.

A further object is to provide an apparatus that will occupy but little space and will render the erection of large brew-houses unnecessary.

A further object is to provide a cooker apparatus adapted expressly for use in small breweries; and our invention consists in the constructions and combinations hereinafter described and claimed.

In the process of manufacturing beer it is customary to provide a series of kettles, tanks, and vats through which the liquid passes in the various stages of its manufacture. These kettles or tanks are located upon several floors in the brewery for convenience in transferring their contents by gravity from one to the other, and each tank is designated by a certain name indicative of the purpose or use for which it is designed—such as, for instance, a "mash-cooker," a "brewing-kettle," a "hop-extractor," a "hop-jack," and a "beer-reserve or storage tank." These kettles being on different floors necessitates the employment of large buildings and heavy costly floors and being themselves of expensive construction greatly increase the cost of a brewery.

In the accompanying drawings, forming a part of this application, Figure 1 is a vertical section of a brewing cooker or tank embodying our invention. Fig. 2 is a sectional view on the line $xx$ of Fig. 1. Fig. 3 is a horizontal section on the line $yy$ of Fig. 4. Fig. 4 is a vertical section on the line $zz$ of Fig. 3, and Fig. 5 is a detail of the perforated sectional plate or bottom.

In the drawings, 2 represents the shell or casing of the cooker or kettle apparatus, which may be of any suitable size commensurate with the capacity of the brewery. The apparatus, located in any suitable place in the building, is preferably provided with an arched top 3, having an overflow-flange 4, adapted to catch any overflow coming through the opening 5 when the cover 6 is removed or any matter spilled in charging the apparatus, which overflow may be taken away by the pipe 72. A charging-opening 5 is provided covered by a suitable plate 6, and through this opening the cooker is charged with the requisite quantity of malt when it is used as a mash-tub, and through the same opening hops may be inserted when the apparatus is used as a hop-extractor. A bearing 7 is provided in the top 3 for the upper end of a shaft 8, carrying a beveled gear 9, meshing with a pinion 10 on a horizontal driving-shaft 11, that is also supported at one end in the bearing 7.

12 is a pipe through which steam may be admitted through the top of the apparatus, said pipe being provided with a valve 13, below which we prefer to arrange a branch pipe 14, with which water and air pipes 15 and 16 are connected and provided, respectively, with valves 17 and 18.

The top 3 is also provided with an opening 19, adapted to be covered when it is desired to retain the vapor within the cooker. When it is desired to allow the vapor to escape, the cover over the opening 19 is removed and a pipe composed of telescoping sections 20 and 21 is fitted over the opening, through which the steam and vapor are conducted out of the building.

We prefer to provide a pipe 22 in the cover, carrying a safety-valve 23 and a steam-gage 24. Within the cooker we provide cross-bars 25, having bearings for the shaft 8. A series of agitators or paddles 26 are secured to said shaft by set-screws 27 or other suitable means and arranged with their blades oppositely inclined at an angle of about forty-five degrees, so that when the shaft is revolved the mash will be lifted and thoroughly agitated and mixed. The lower end of the shaft 8 is mounted in a step or foot-piece 28, supported on a stand 29, secured to a concave plate 30, forming the inner wall of the double bottom of the cooker. 31 represents the lower or outer wall of the bottom connected with the plate 30 by tie-bolts 32, forming a steam-chamber 33. Above the bearing or step 28, resting in an annular recess 34 therein, is a disk constituting a false bottom, provided with perforations 35 and preferably composed of a series of sector-shaped sections 36. Narrow flanges or bars 37 are secured to the sections by rivets 38, each flange projecting beyond the edge of the section to form a supporting-shelf or rest for the adjoining plate or section. An annular groove 39 is provided in the bottom of the recess 34 to receive the heads of the rivets that are near the inner ends of said flanges. After the sections composing the disk are arranged in position a ring 40 is placed upon the step or bearing and extending out over the inner ends of the sections holds them firmly in position in the recess. Any suitable means may be provided for fastening the ring in place; but we have shown suitable lag-screws 41, extending through the ring and disk into the bearing beneath. The heads of the rivets resting in the annular groove and the pressure of the ring upon the sections will hold them all firmly bound together as if made in one piece; but upon loosening the ring the sections composing the disk become readily separable and may be taken out of the apparatus. To permit convenient removal of the sections, we provide a manhole in the wall of the apparatus, which is normally closed by a cover 42. When the hole is uncovered, the operator may go into the interior of the apparatus and insert or remove the sections composing the disk, as may be desired.

On the shaft 8, above and near the perforated disk, we prefer to provide a paddle or agitator 43, carrying a chain 44, that is adapted to brush or sweep over the perforated disk and keep the holes therein clear of obstruction. As shown in Fig. 1, we preferably provide a sufficient space between the paddle 43 at the lower end of the shaft and the lower paddle 26 of the series above to secure convenient access through the manhole to the perforated disk and the lower paddle or agitator. In the wall opposite the manhole may be conveniently placed a thermometer 45, and above the plate 30, on each side of the apparatus, are steam-inlet pipes 46, having valves 47 and air-pipes 48, through which air may be admitted into the apparatus for aerating purposes. Valves 49 are placed in the air-pipe to control the admission of air to the apparatus. Steam is conducted to the chamber 33, formed between the plates 30 and 31, by pipes 51, having suitable valves 52. A pipe 53, having a valve 54, carries away the water of condensation to a trap. (Not shown.)

55 is a discharge-pipe projecting through the double bottom of the apparatus into the space beneath the perforated floor or disk and extending above the top of the apparatus on the outside, where a branch pipe 56, having a valve 60, leads to a strainer or mash-tub 57. A valve 58 in the pipe 55, near the double bottom, is normally closed when the apparatus is in use. A valve 59 above the branch pipe controls communication of pipe 55 to any usual type of cooler 74. A drain-pipe 61, having a valve 62, is provided in the pipe 55, preferably at a point near the bottom of the apparatus, and a steam clean-out pipe 63, having a branch air-pipe 64, is connected to said drain-pipe. This arrangement of the clean-out pipe permits the operator to keep the pipe 55 clear of all obstructions and to wash it out thoroughly each time the apparatus or receptacle is emptied.

65 is a steam-pipe through which steam may be admitted into the pipe 55.

A perforated floor 66 is provided in the bottom of the strainer-tub, and a pipe 67, having a valve 68, connects the bottom of said tub with a small cylindrical receptacle 69, commonly called among brewers a "grant." A pipe 70, having a valve 71, connects the bottom of the receptacle 69 with the upper portion of the apparatus, and an overflow-pipe 72, having a valve 73, extends from the pipe 70 up along the outside of the apparatus through the flange 4 and is adapted to convey any of the overflow back into the apparatus.

In operation the apparatus is first used as a cooker for the mash, the perforated disk is removed, and the lower paddle or agitator utilized solely to mix up and agitate the mass at the bottom of the apparatus. The receptacle is then charged with the requisite quantity of malt and water, steam is admitted through pipes 46, and the agitators or paddles are set in motion to thoroughly agitate and mix the mass while it is subjected to a cooking process. At such time the vapor-opening in the top of the apparatus may be either closed or open, as desired. When the mash has cooked a sufficient length of time, the valve 58 is opened, allowing the mash to flow into the discharge-pipe, and steam or air is admitted to the top of the cooker through the pipe 12 to force the mash up the pipe 55 into the strainer-tub, the passage to the cooler being closed. In this way the cooker may be entirely emptied of its contents in a short time, and upon closing the valve 60, opening the valve 62, and allowing water to flow into the cooker through the pipe 12 the operator may thoroughly clean the interior of the apparatus. After the mash has passed out of the cooker and the interior of the apparatus has been cleaned the operator closes the valves 13 and 58 and inserts the perforated disk or floor. The disk being composed of separable sections, as above described, can be readily inserted through the manhole, and the operator can easily reach in and secure the disk in place. The manhole is then closed, and the apparatus is ready for use as a kettle. By the time the operator has thus transformed the apparatus from a cooker to a kettle the wort will have drained through the perforated floor of the strainer-tub, leaving the grain therein, and upon opening the valve 68 the liquid will flow down into the grant and thence back into the kettle. When the apparatus is used as a brewing-kettle, we prefer to admit the steam into the chamber 33 instead of directly into the interior of the apparatus. The wort can in this way be boiled without the steam coming in direct contact or mingling therewith, and air may be admitted through the pipe 48 for aerating purposes. After the wort has been boiled for a certain length of time—depending upon the preference of the brewer—the hops are placed in the kettle and subjected to the action of the boiling wort for the purpose of extracting the flavors or aromas. After the hops are placed in the kettle the agitators may be set in motion to thoroughly mix the hops and wort. At this stage of the process the apparatus herein described takes the place and performs the function of the tank known as the "hop-extractor." We usually prefer, during the process of boiling the wort and extracting the flavors and aromas from the hops, to leave the vapor-pipe open; but the same may be closed, if preferred. When the wort has been boiling the desired length of time, the valves 58 and 59 are open, the valve 60 being closed, and steam admitted through the pipe 12 to force the liquid up through the pipe 55 to the cooler. The hops will settle to the bottom of apparatus and will be separated from the liquid by the perforated disk. In the separation the apparatus performs the function of the tank or vat known as the "hop-jack." We have found that the desired flavors will be thoroughly extracted by boiling the hops with the wort, and the steam acting on the hops as they lie on the perforated disk will so completely remove all the wort therefrom that nothing but clear water can be wrung out of them after removal from the kettle. After the hops have been separated from the wort and removed from the kettle through the side manhole the perforated disk may be taken apart and removed, and after washing out the apparatus and flushing the discharge-pipe the receptacle may be utilized as a storage or reserve tank for the beer until such time as it is desired to use it as a mash-cooker. The apparatus is thus successfully employed as a mash-cooker, a brewing-kettle, a hop-extractor, a hop-jacket, and, finally, a storage or beer-reserve tank. The single receptacle performs all the functions of a series of independent tanks and enables us to effect a great saving in the cost of a brewing apparatus and to carry on the manufacture of beer within a much smaller space than is usually required for that purpose. By providing the system of steam, air, and water pressure pipes and the various traps and clean-out connections we are enabled rapidly and effectually to cleanse the interior of the the receptacle and the discharge-pipe during the interval between the emptying of the receptacle of the material representing one stage of the process and filling it with material representing another.

It will be understood, of course, that the size of the apparatus may be varied according to the capacity of the brewery, and that the various pipe connections and attachments may be added to or diminished or arranged in different positions with respect to the receptacle, according to the preference of the brewer.

Having thus described our invention, what we claim as new, and desire to secure by Letters Patent, is—

1. In an apparatus of the character described, a casing provided with a charging-opening, means for admitting air and steam at the top of said casing, means for admitting steam near the bottom of said casing, agitators arranged within said casing, a strainer-tub, a discharge-pipe leading from the bottom of said casing to the strainer-tub, a grant, a discharge-pipe from the strainer-tub to said grant, a discharge-pipe from the grant to said casing, and valves suitably arranged in said discharge-pipes, substantially as described.

2. In an apparatus of the character described, a casing provided with a charging-opening, an overflow-flange surrounding said charging-opening, means for admitting air and steam at the top of said casing, means for admitting steam near the bottom of said casing, agitators arranged within said casing, a strainer-tub, a discharge-pipe leading from the bottom of said casing to the strainer-tub, a grant, a discharge-pipe from the grant to said casing, an overflow-pipe leading from within said overflow-flange to said last discharge-pipe, a valve in said overflow-pipe, and valves arranged in said discharge-pipes, substantially as described.

3. In an apparatus of the character described, a casing provided with a charging-opening, means for admitting air and steam at the top of said casing, means for admitting steam near the bottom of said casing, agitators arranged within said casing, a strainer-tub, a discharge-pipe leading from the bottom of said casing to the strainer-tub, a valved drain-pipe from said discharge-pipe, a steam-pipe communicating with said discharge-pipe, whereby said discharge-pipe may be washed out through the drain-pipe, a grant, a discharge-pipe from the strainer-tub to said grant, a discharge-pipe from the grant to said casing, and valves suitably arranged in said discharge-pipes, substantially as described.

4. In an apparatus of the character described, a casing provided with a charging-opening, an overflow-flange surrounding said charging-opening, means for admitting air and steam at the top of said casing, means for admitting steam near the bottom of said casing, agitators arranged within said casing, a strainer-tub, a discharge-pipe leading from the bottom of said casing to the strainer-tub, a valved drain-pipe from said discharge-pipe, a steam-pipe communicating with said discharge-pipe, whereby said discharge-pipe may be washed out through the drain-pipe, a grant, a discharge-pipe from the strainer-tub to said grant, a discharge-pipe from the grant to said casing, an overflow-pipe leading from within said overflow-flange to said last discharge-pipe, a valve in said overflow-pipe, and valves arranged in said discharge-pipes, substantially as described.

5. In an apparatus of the character described, a casing provided with a charging-opening, means for admitting air, steam and water to the top of said casing, means for admitting air and steam near the bottom of said casing, a perforated false bottom within said casing, agitators arranged within said casing, a cooler, a strainer-tub, a discharge-pipe communicating with said casing below its false bottom and leading to the cooler and strainer-tub, a grant, a discharge-pipe from the strainer-tub to said grant, a discharge-pipe from the grant to said casing, and valves suitably arranged in said discharge-pipes, substantially as described.

6. In an apparatus of the character described, a casing provided with a charging-opening, an overflow-flange surrounding said charging-opening, means for admitting air, steam and water to the top of said casing, means for admitting air and steam near the bottom of said casing, a perforated false bottom within said casing, agitators arranged within said casing, a cooler, a strainer-tub, a discharge-pipe communicating with said casing below its false bottom and leading to the cooler and strainer-tub, a grant, a discharge-pipe from the strainer-tub to said grant, a discharge-pipe from the grant to said casing, an overflow-pipe leading from within said overflow-flange to said last discharge-pipe, a valve in said overflow-pipe, and valves arranged in said discharge-pipes, substantially as described.

7. In an apparatus of the character described, a casing provided with a charging-opening, means for admitting air, steam and water to the top of said casing, means for admitting air and steam near the bottom of said casing, a perforated false bottom within said casing, agitators arranged within said casing, a cooler, a strainer-tub, a discharge-pipe communicating with said casing below its false bottom and leading to the cooler and strainer-tub, a valved drain-pipe from said discharge-pipe, a steam-pipe communicating with said discharge-pipe, whereby said discharge-pipe may be washed out through the drain-pipe, a grant, a discharge-pipe from the strainer-tub to said grant, a discharge-pipe from the grant to said casing, and valves suitably arranged in said discharge-pipes, substantially as described.

8. In an apparatus of the character described, a casing provided with a charging-opening, means for admitting air, steam and water to the top of said casing, means for admitting air and steam near the bottom of said casing, a perforated false bottom within said casing, agitators arranged within said casing, means for actuating said agitators, a sweep carried by the agitator adjacent said perforated false bottom and arranged to traverse said false bottom and maintain the perforations thereof clear, a cooler, a strainer-tub, a discharge-pipe communicating with said casing below its false bottom and leading to the cooler and strainer-tub, a grant, a discharge-pipe from the strainer-tub to said grant, a discharge-pipe from the grant to said casing, and valves suitably arranged in said discharge-pipes, substantially as described.

9. In an apparatus of the character described, a casing provided with a charging-opening, means for admitting air, steam and water to the top of said casing, means for admitting air and steam near the bottom of said casing, a double bottom formed on said casing and constituting a steam-chamber, valved inlet and outlet pipes to said steam-chamber, a perforated false bottom within said casing, a cooler, a strainer-tub, a discharge-pipe communicating with said casing below its false bottom and leading to the cooler and strainer-tub, a grant, a discharge-pipe from the strainer-tub to said grant, a discharge-pipe from the grant to said casing, and valves arranged in said discharge-pipes, substantially as described.

10. In an apparatus of the character described, a casing provided with a charging-opening, means for admitting air, steam and water to the top of said casing, means for admitting air and steam near the bottom of said casing, a double bottom formed on said casing and constituting a steam-chamber, valved inlet and outlet pipes to said steam-chamber, a perforated false bottom within said casing, agitators arranged within said casing, means for actuating said agitators, a sweep carried by the agitator adjacent said perforated false bottom and arranged to traverse said false bottom and maintain the perforations thereof clear, a cooler, a strainer-tub, a discharge-pipe communicating with said casing below its false bottom and leading to the cooler and strainer-tub, a grant, a discharge-pipe from the strainer-tub to said grant, a discharge-pipe from the grant to said casing, and valves arranged in said discharge-pipes, substantially as described.

11. In an apparatus of the character described, a casing provided with a charging-opening, a shaft journaled in the top of said casing, means constructed to actuate said shaft, a bearing within said casing for the lower end of said shaft, a false bottom in said casing, comprising a series of perforated sectors, a flange on the lower surface of each sector and projecting along one of the radial edges thereof in position to support the contiguous radial edge of the adjacent perforated sector, a seat on said shaft-bearing for the inner ends of said perforated sectors, means constructed to clamp said perforated sectors to said seat, a plurality of agitators carried on said shaft, and a discharge-pipe communicating with said casing below said false bottom, substantially as described.

12. In an apparatus of the character described, a casing provided with a charging-opening, a shaft journaled in the top of said casing, means constructed to actuate said shaft, a bearing within said casing for the lower end of said shaft, a false bottom in said casing, comprising a series of perforated sectors, a flange on the lower surface of each sector and projecting along one of the radial edges thereof in position to support the contiguous radial edge of the adjacent perforated sector, a seat on said shaft-bearing arranged to support the inner ends of said perforated sectors, means constructed to clamp said perforated sectors to said seat, a plurality of agitators carried by said shaft, a sweep carried by the agitator adjacent said false bottom and arranged to traverse said false bottom to maintain the perforations thereof clear, and a discharge-pipe communicating with said casing below said false bottom, substantially as described.

In testimony whereof we affix our signatures in the presence of two subscribing witnesses.

ARMIN L. NEUBERT.
SIEGMUND T. WIEDENBECK.

Witnesses:
WM. M. WRIGHT,
J. C. THILL.